US009921884B1

(12) United States Patent
McInerny

(10) Patent No.: US 9,921,884 B1
(45) Date of Patent: Mar. 20, 2018

(54) LOCAL AND REMOTE ACCESS TO VIRTUAL MACHINE IMAGE FILESYSTEMS

(71) Applicant: Amazon Technologies, Inc., Seattle, WA (US)

(72) Inventor: Michael J. McInerny, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 340 days.

(21) Appl. No.: 13/666,433

(22) Filed: Nov. 1, 2012

(51) Int. Cl.
  *G06F 9/455* (2006.01)
  *G06F 9/50* (2006.01)
  *G06F 17/30* (2006.01)
  *G06F 3/06* (2006.01)

(52) U.S. Cl.
  CPC ...... *G06F 9/5077* (2013.01); *G06F 17/30067* (2013.01); *G06F 3/0605* (2013.01)

(58) Field of Classification Search
  CPC . G06F 17/30067; G06F 3/0605; G06F 9/5077
  USPC .......................................................... 718/1
  See application file for complete search history.

(56) References Cited

U.S. PATENT DOCUMENTS

| | | | |
|---|---|---|---|
| 6,356,863 B1 * | 3/2002 | Sayle | 703/27 |
| 7,043,534 B1 * | 5/2006 | Donnelly | H04L 67/10 709/203 |
| 7,774,391 B1 * | 8/2010 | Le | G06F 17/30091 707/822 |
| 7,904,482 B2 * | 3/2011 | Lent | G06F 17/30067 707/791 |
| 8,046,550 B2 * | 10/2011 | Feathergill | G06F 11/1466 711/162 |
| 8,280,816 B2 * | 10/2012 | Dasgupta | G06F 21/51 705/56 |
| 8,332,570 B1 * | 12/2012 | Cook et al. | 711/6 |
| 8,352,939 B1 * | 1/2013 | Edwards | G06F 9/45533 707/755 |
| 8,392,838 B2 * | 3/2013 | Chawla et al. | 715/748 |
| 8,738,871 B1 * | 5/2014 | Naftel | G06F 11/1448 711/162 |
| 2003/0182389 A1 * | 9/2003 | Edwards | G06F 17/30067 709/213 |
| 2007/0094659 A1 * | 4/2007 | Singh et al. | 718/1 |
| 2007/0300220 A1 * | 12/2007 | Seliger | G06F 8/61 718/1 |
| 2009/0216975 A1 * | 8/2009 | Halperin et al. | 711/162 |
| 2010/0049929 A1 * | 2/2010 | Nagarkar et al. | 711/162 |

(Continued)

OTHER PUBLICATIONS

Willem et al. "Accessing Files on Unmounted File Systems" Proceedings of the LISA 2001 15th Systems Administration Conference, Dec. 2-7, 2001, pp. 1-7.*

(Continued)

*Primary Examiner* — Benjamin Wu
*Assistant Examiner* — Willy W Huaracha
(74) *Attorney, Agent, or Firm* — Lee & Hayes, PLLC

(57) ABSTRACT

Mechanisms are disclosed for mount and non-mount based access to filesystems contained in virtual disks in virtual machine images. Access can be had to the filesystems even when the virtual machine images are not executing. Access to the filesystems can also be provided to local and remote client applications. Access can also be provided to snapshots of the virtual machine images at various points in time.

19 Claims, 8 Drawing Sheets

(56) References Cited

U.S. PATENT DOCUMENTS

| | | | |
|---|---|---|---|
| 2010/0058106 A1* | 3/2010 | Srinivasan et al. | 714/2 |
| 2011/0185292 A1* | 7/2011 | Chawla et al. | 715/760 |
| 2011/0185355 A1* | 7/2011 | Chawla et al. | 718/1 |
| 2012/0259900 A1* | 10/2012 | Kacin | G06F 17/30233 707/823 |
| 2014/0095817 A1* | 4/2014 | Hsu et al. | 711/162 |
| 2015/0163282 A1* | 6/2015 | Siegman | G06F 3/0605 709/208 |

OTHER PUBLICATIONS vmware, Technical Papers, The Open Virtual Machine Format Whitepaper for OVF Specification, Sep. 7, 2007 [online][retrieved on Sep. 17, 2012] retrieved from: http://www.vmware.com/pdf/ovf_whitepaper_specification.pdf , 16 pps.

Wikipedia, "Loop Device"[online] [retrieved on Sep. 24, 2012] retrieved from: http://en.wikipedia.org/wiki/Loop_device 4 pps.

"Using Parallels Mounter" [online][retrieved on Sep. 24, 2012] retrieved from: http://download.parallels.com/desktop/v4/docs/en/Parallels_Explorer_Users_Guide/23687.htm.

"Sharing Folders and Disks" [online][retrieved on Sep. 24, 2012] retrieved from: http://download.parallels.com/desktop/v5/docs/en/Parallels_Explorer_Users_Guide/30589.htm 3 pps.

* cited by examiner

LOCAL AND REMOTE ACCESS TO VIRTUAL MACHINE IMAGE FILESYSTEMS

BACKGROUND

Virtual machines provide a mechanism to create and manage files that are frequently encapsulated in virtual machine images ("VMIs"). The files stored in a VMI are only available, however, when the VMI is actively executing on a virtual machine. As a result, it may be necessary to start execution of a VMI to retrieve only a single file from within the VMI.

In certain circumstances it might not be possible or may be imprudent to start execution of a VMI. For instance, it might not be possible to start execution of a VMI when the VMI will not boot due to a problem with the VMI. Similarly, it might be imprudent or impossible to start the execution of a VMI when a virus or other type of malicious program has infected the VMI. These scenarios can be frustrating for a user who needs to quickly retrieve one or more files from within a filesystem within a VMI.

It is with respect to these and other considerations that the disclosure made herein is presented.

DETAILED DESCRIPTION

Figure 1:
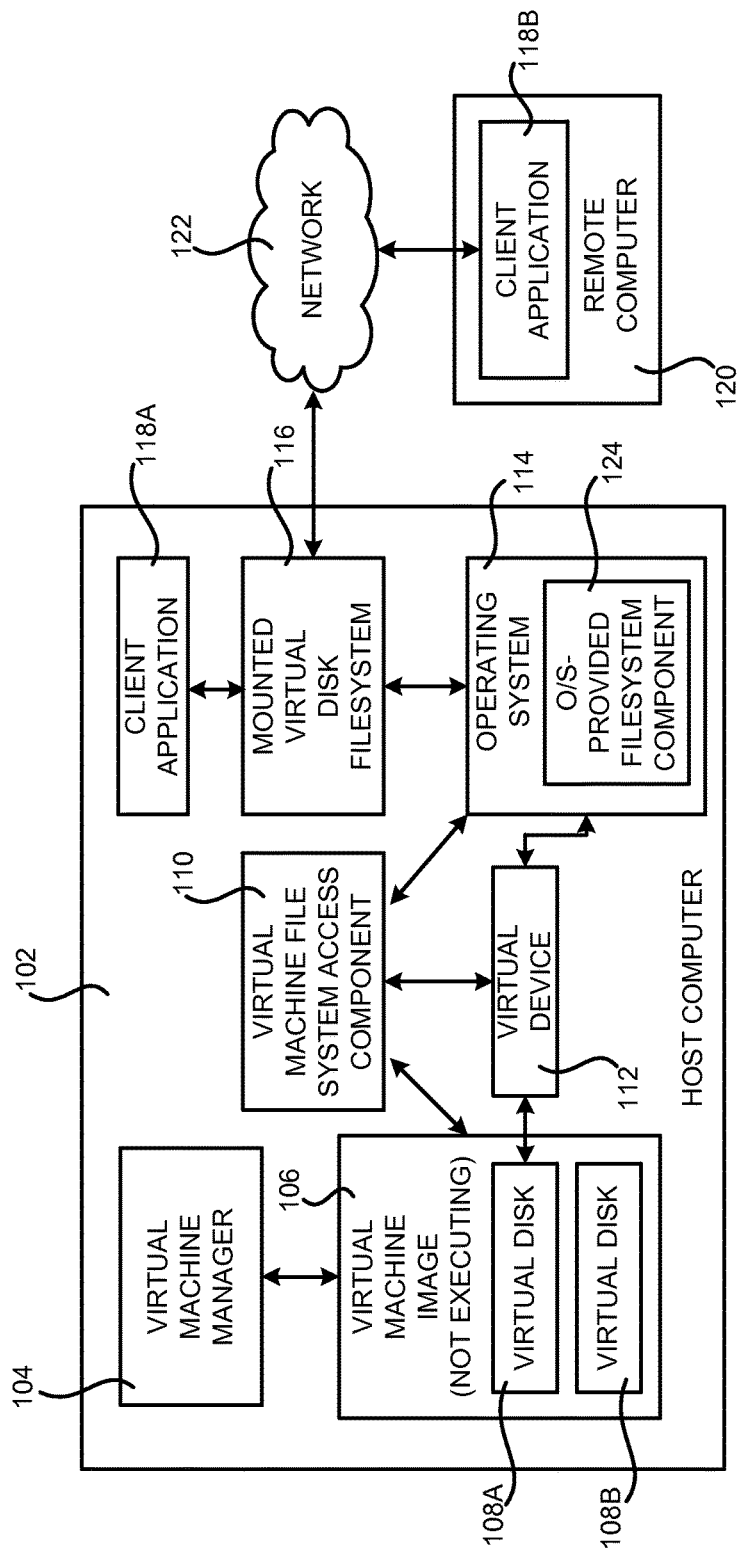
FIG. 1 is a network and system diagram showing aspects of one mechanism presented herein for providing local and remote access to VMI filesystems utilizing a mounted virtual disk, according to one embodiment disclosed herein.

The following detailed description is directed to technologies for providing local and remote access to VMI filesystems. Utilizing the technologies described herein, files stored in a VMI can be quickly accessed without executing the VMI. Moreover, access can be had to the files stored in the VMI from the host machine where the VMI is stored or from a remotely located computer. Additional details regarding these and other aspects of the concepts and technologies disclosed herein for providing local and remote access to VMI filesystems will be provided below.

According to one aspect presented herein, access is provided to a filesystem stored in a virtual disk of a VMI to local and/or remote clients. For example, local and/or remote clients might be permitted to read, write, and/or otherwise modify the contents of a filesystem stored in a virtual disk of a non-executing VMI. In order to provide this functionality, a request is received to access a filesystem stored in a virtual disk of the VMI. For instance, a client application might request to access the filesystem. In response to receiving such a request, a component determines whether the filesystem stored on the virtual disk is quiesced. The filesystem might be quiesced, for instance, if the guest operating system has unmounted the filesystem or if the guest operating system has been shutdown. If the filesystem is quiesced, operations are performed to cause an operating system to mount the filesystem in the virtual disk. Components provided by the operating system may be utilized to interpret the filesystem. If the operating system does not provide support for the filesystem, components not provided by the operating system may be utilized.

After the virtual disk has been mounted, the files within the filesystem in the virtual disk can be accessed through the usual filesystem interface of the operating system, without any need for special functionality. For instance, the files and folders within the filesystem of the mounted virtual disk might be accessed and/or modified locally and/or remotely using a local or a networked filesystem. The files and folders within the mounted virtual disk might also be accessed remotely by way of an operating system provided component, such as a file transfer protocol ("FTP") component, a HTTP component, or another type of remote access component. Other mechanisms might also be utilized to access and modify the filesystem in the mounted virtual disk.

According to another aspect, local and remote access can also be provided to a filesystem stored in a virtual disk in a VMI without mounting the virtual disk. This might be desirable, for instance, if the virtual disk is suspected to be infected with a virus or other type of malicious program code. Not mounting the virtual disk reduces the risk that the host computer or a remote computer accessing the virtual disk will become infected by malicious components stored in the filesystem of the virtual disk.

In order to access and/or modify the contents of the filesystem without mounting the virtual disk, a virtual machine filesystem access component is configured in one embodiment with functionality to read and/or modify the filesystem of a virtual disk in a VMI. The virtual machine filesystem access component might utilize operating system provided components to translate the filesystem, or might perform the translation without utilizing operating system provided components if operating system provided components are unavailable for translating a particular type of filesystem.

The virtual machine filesystem access component provides an interface through which local or remotely executing client applications can request to perform operations on the filesystem contained in the virtual disk. For example, the virtual machine filesystem access component might provide a hypertext markup language ("HTML") over hypertext transfer protocol ("HTTP") Web-based user interface through which a user can request that operations be performed on the filesystem in the virtual disk. A user might request, for instance, to download a file from the filesystem, to modify a file or folder, to move a file or folder, or to perform another type of operation on the filesystem. In response to receiving such a request, the virtual machine filesystem access component performs the requested operation and presents the results of the operation to the requesting client application. Other types of interfaces might also be exposed for accessing the filesystem in the virtual disk.

According to another aspect, the components described herein might also be configured to provide mount-based or non-mount based access to a snapshot of a virtual disk within a VMI. A snapshot is data representing the state of a virtual machine and/or a virtual disk at a particular point-in-time. Snapshots might be generated by creating a base image and performing log-based copy-on-write operations when changes are made to the base image. By providing functionality for accessing the contents of a snapshot at a particular point in time, various types of functionality are enabled.

For example, an incremental snapshot might be mounted in the manner presented above. The mounted snapshot might then be compared to a reference disk image to identify any differences between the filesystem in the snapshot and the filesystem in the reference image. Identified differences might provide an indication of an unauthorized modification to the snapshot filesystem, such as those performed by viruses or other types of malicious program code. Additional details regarding the various components and processes described above for providing local and remote access to VMI filesystems will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network and system diagram showing aspects of one mechanism presented herein for providing local and remote access to VMI filesystems utilizing a mounted virtual disk, according to one embodiment disclosed herein. As shown in FIG. 1, a host computer 102 is configured to execute a virtual machine manager ("VMM") 104 in one embodiment. The VMM 104 permits multiple, independent guest operating systems to concurrently execute on a single host computer 102. To enable this functionality, the VMM 104 abstracts the hardware of the host computer 102 to create one or more virtual machines. The VMM 104 may be implemented in the hardware of the host computer 102 or it may be implemented as a software module that executes at a low-level in the host computer 102 to provide services to virtual machines. In one implementation, the VMM 104 is a hypervisor. Other types of VMMs might also be utilized in other implementations.

The guest operating systems managed by the VMM 104 are commonly encapsulated in a virtual machine image 106. A virtual machine image 106 typically describes aspects of a virtual machine, such as hardware devices present in the virtual machine, stores the contents of a virtual machine's random access memory ("RAM"), and includes one or more virtual disks 108A-108B (which might be referred to herein individually as a "virtual disk 108" or collectively as the "virtual disks 108"). Details regarding one illustrative configuration for a virtual machine image 106 will be provided below with regard to FIG. 2.

The virtual disks 108, which might also be known as virtual disk images, encapsulate a filesystem, such as those typically utilized by physical storage devices. For instance, the virtual disk 108A might encapsulate a file allocation table ("FAT") filesystem. Similarly, the virtual disk 108B might encapsulate another type of filesystem, such as a UNIX-based filesystem. Other types of filesystems might also be utilized in other virtual disks 108. In this regard it should be appreciated that while two virtual disks 108 have been illustrated in FIG. 1, more or fewer virtual disks 108 might be utilized in other embodiments.

The filesystems in the virtual disks 108 might be utilized to store an operating system, application programs, other types of programs, and data. For instance, the filesystem of the virtual disk 108A might be utilized to store an operating system that is utilized to boot and execute the virtual machine defined by the VMI 106. In this regard, it should be appreciated that the VMM 104 might maintain the VMI 106 in various states. In an executing state, for instance, the VMI 106 is being executed by the host computer 102. In a suspended state, the VMI 106 is not executing (i.e. the VMI 106 has been "paused"), but data stored in the RAM and caches of the virtual machine may not have been quiesced. In a shut down state, the VMI 106 is not executing and the data stored in the RAM and caches of the virtual machine has been quiesced into the VMI 106. The embodiments disclosed herein may provide access to and modification of the filesystems in any of the states mentioned above. However, accessing and modifying the filesystems in any state wherein the data stored in the RAM and caches of the virtual machine has not been quiesced may result in inconsistent data in the filesystems.

In order to provide the functionality described herein for providing access to a virtual disk 108 in a VMI 106 by mounting the virtual disk 108, the host computer 102 is configured in one embodiment to execute a virtual machine ("VM") filesystem access component 110. The VMI filesystem access component 110 is a service, application, or another type of component that is configured in one embodiment to receive a request to enable access to a virtual disk 108, such as from a user or a client application. In the example shown in FIG. 1, for instance, the VM filesystem access component 110 configures the virtual device 112 to permit access to the virtual disk 108A.

In response to receiving such a request, the VM filesystem access component 110 is configured in one embodiment to create a virtual device 112. The virtual device 112 is a pseudo-device that makes a file, such as the virtual disk 108, accessible as a block device. In embodiments implemented in UNIX-like operating systems, the virtual device 112 is a loop device, vnode disk ("vnd"), or loopback file interface ("lofi"). Other types of virtual devices or other mechanisms that provide similar functionality might also be utilized.

Once the virtual device 112 has been created, the VM filesystem access component 110 instructs an operating system 114 executing on the host computer 102 to mount the virtual device 112. Once the operating system 114 has mounted the virtual device 112, the virtual disk 108A becomes accessible to the operating system 114 and client applications by way of the mounted virtual disk filesystem 116. In some cases, the operating system 114 includes one or more components 124 that can be utilized to interpret and/or translate the filesystem of the virtual disk 108. In these cases, the operating system provided component 124, or components, can be utilized to interpret and/or translate the filesystem. For example, many operating systems include functionality for mounting the FAT filesystem. Many operating systems may not have the capability to mount other types of filesystems. In this case, the VM filesystem access component 110 might provide components for interpreting and/or translating the filesystem of the virtual disk 108. Other types of non-operating system components might also be utilized for interpreting and/or translating filesystems not recognized by the operating system 114.

As mentioned above, the mounted virtual disk filesystem 116 allows the operating system and applications executing on the host computer 102, such as the client application 118A, to access the filesystem of the virtual disk 108A. In this regard, the operating system and client application 118A might perform read and/or modify operations on the filesystem. For instance, the operating system and/or the client application 118A might read files, modify files, create new files, move files, create directories, move directories, and modify directories. Other types of operations might also be performed. In this way, local access to a filesystem contained in a virtual disk 108 in a VMI can be provided.

Remote access to the filesystem in the virtual disk 108A can also be provided by way of the mounted virtual disk filesystem 116 in embodiments. For instance, the operating system 114 might expose the mounted virtual disk filesystem 116 to networked client applications by way of a networked file system. For instance, the client application 118B executing on the remote computer 120 might be permitted to access the mounted virtual disk filesystem 116 by way of the network 122 in this manner. Other mechanisms might also be provided by the operating system 114 for accessing the mounted virtual disk filesystem 116, such as FTP or HTTP access. Additional details regarding these and other mechanisms for providing local and remote access to a filesystem of a virtual disk of a VMI 106 by way of a mounted virtual disk filesystem 116 will be provided below with regard to FIGS. 2 and 3.

Figure 2:
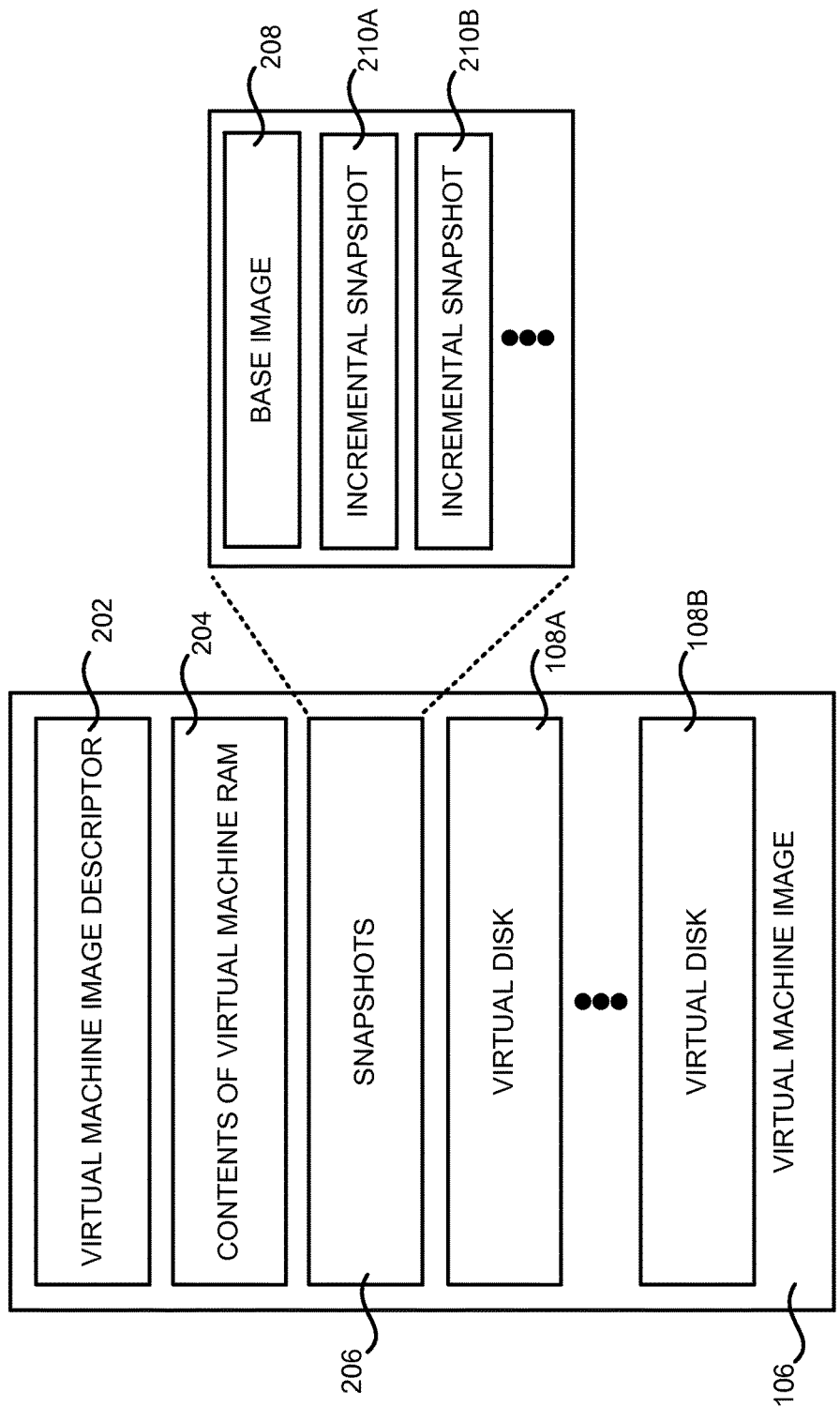
FIG. 2 is a data structure diagram showing aspects of the configuration of a VMI, according to one embodiment disclosed herein.

FIG. 2 is a data structure diagram showing aspects of the configuration of a VMI 106, according to one embodiment disclosed herein. As mentioned briefly above, the VMI 106 describes aspects of a virtual machine, such as hardware devices present in the virtual machine. In the example VMI 106 shown in FIG. 2, for instance, a VMI descriptor 202 provides a description of the hardware resources that define the virtual machine. The VMI descriptor 202 might describe aspects of the central processing unit ("CPU"), graphics processing unit ("GPU"), RAM, and input/output ("I/O") devices of a virtual machine. The VMI descriptor 202 might also include data identifying the current execution state of a virtual machine (i.e. running, shutdown, paused, etc.) and the location of storage devices connected to the virtual machine. The VMI descriptor 202 might also describe other aspects of the hardware of a virtual machine.

The VMI 106 might also store the contents of RAM 204 for a virtual machine. This might be created, for instance, when a virtual machine is suspended. The contents of RAM 204 can be reloaded when execution of the virtual machine is resumed so that execution restarts at the point at which it was suspended. A VMI 106 for a shut down virtual machine might not include the contents of RAM 204 of the virtual machine.

In one implementation, the VMI 106 might also include one or more snapshots 206. As mentioned briefly above, the VMM 104 might provide functionality for creating snapshots 206 of executing virtual machines. A snapshot 206 is data representing the state of a virtual machine and/or a virtual disk 108 at a particular point-in-time. The VMM 104 might generate the snapshots 206 by first creating a base image 208. When changes are made to the base image, such as by disk writes for example, the VMM 104 may create one or more incremental snapshots 210A-210B relative to the base image 208 by performing log-based copy-on-write operations. Each of the incremental snapshots 210A-210B represents the state of a virtual machine at a particular point in time. The VMM 104 might also provide various types of functionality utilizing the snapshots 206, such as rolling back a virtual machine to a particular point in time. Other types of functionality might also be provided.

As will be described in greater detail below with regard to FIGS. 6 and 7, the components presented herein might also be configured to provide mount-based or non-mount based access to a snapshot 206 of a virtual disk within a VMI 106. By providing functionality for accessing the contents of a snapshot 206 at a particular point in time, even when the VMI 106 containing the snapshot 206 is not executing, various types of functionality may be enabled. For example, an incremental snapshot 210A might be mounted in the manner presented above. The mounted snapshot 210A might then be compared to a reference disk image to identify any differences between the filesystem in the snapshot 210A and the filesystem in the reference image. Identified differences might provide an indication of an unauthorized modification to the snapshot filesystem, such as those performed by viruses or other types of malicious program code. Additional details regarding these processes will be provided below with regard to FIGS. 6 and 7.

The example VMI 106 shown in FIG. 2 also includes one or more virtual disks 108A-108B. As discussed above, the virtual disks 108 encapsulate a filesystem, such as those typically utilized by physical storage devices. For instance, the virtual disk 108A might encapsulate a FAT filesystem. Similarly, the virtual disk 108B might encapsulate another type of filesystem, such as a UNIX-based filesystem. Other types of filesystems might also be utilized in other virtual disks 108. In this regard it should be appreciated that while two virtual disks 108 have been illustrated in the VMI 106 shown in FIG. 2, more or fewer virtual disks 108 might be utilized in other embodiments.

As also discussed briefly above, the filesystems in the virtual disks 108 shown in FIG. 2 might be utilized to store an operating system, application programs, other types of programs, and data. For instance, the filesystem of the virtual disk 108A might be utilized to store an operating system that is utilized to boot and execute the virtual machine defined by the VMI 106. As also mentioned above, the VMM 104 might maintain the VMI 106 in various states, such as an executing state, a suspended state, or a shut down state. The embodiments disclosed herein may provide access to and modification of the filesystems in any of these states. Accessing and modifying the filesystems in any state wherein the data stored in the RAM and caches of the virtual machine has not been quiesced into the filesystem may, however, result in inconsistent data in the filesystems.

It should be appreciated that the VMI 106 shown in FIG. 2 is merely illustrative. Other types of VMIs 106 might include more or less information than the VMI 106 shown in FIG. 2. Additionally, the information stored in the VMI 106 might be arranged in a different order or expressed utilizing different types of data structures. Some of the information described above may even be omitted altogether, such as the snapshots 206 when the embodiments presented herein are utilized with a VMM 104 that does not support snapshots. The VMI 106 might also be digitally signed, encrypted, or secured in another manner. In this regard, the VM file system access component 110 might be configured to decrypt a VMI 106 or perform other processing on the VMI 106 prior to providing access to a filesystem contained in a virtual disk 108 in the VMI 106. Additional details regarding the use of the VMI 106 will be provided below with regard to FIGS. 3-8.

Figure 3:
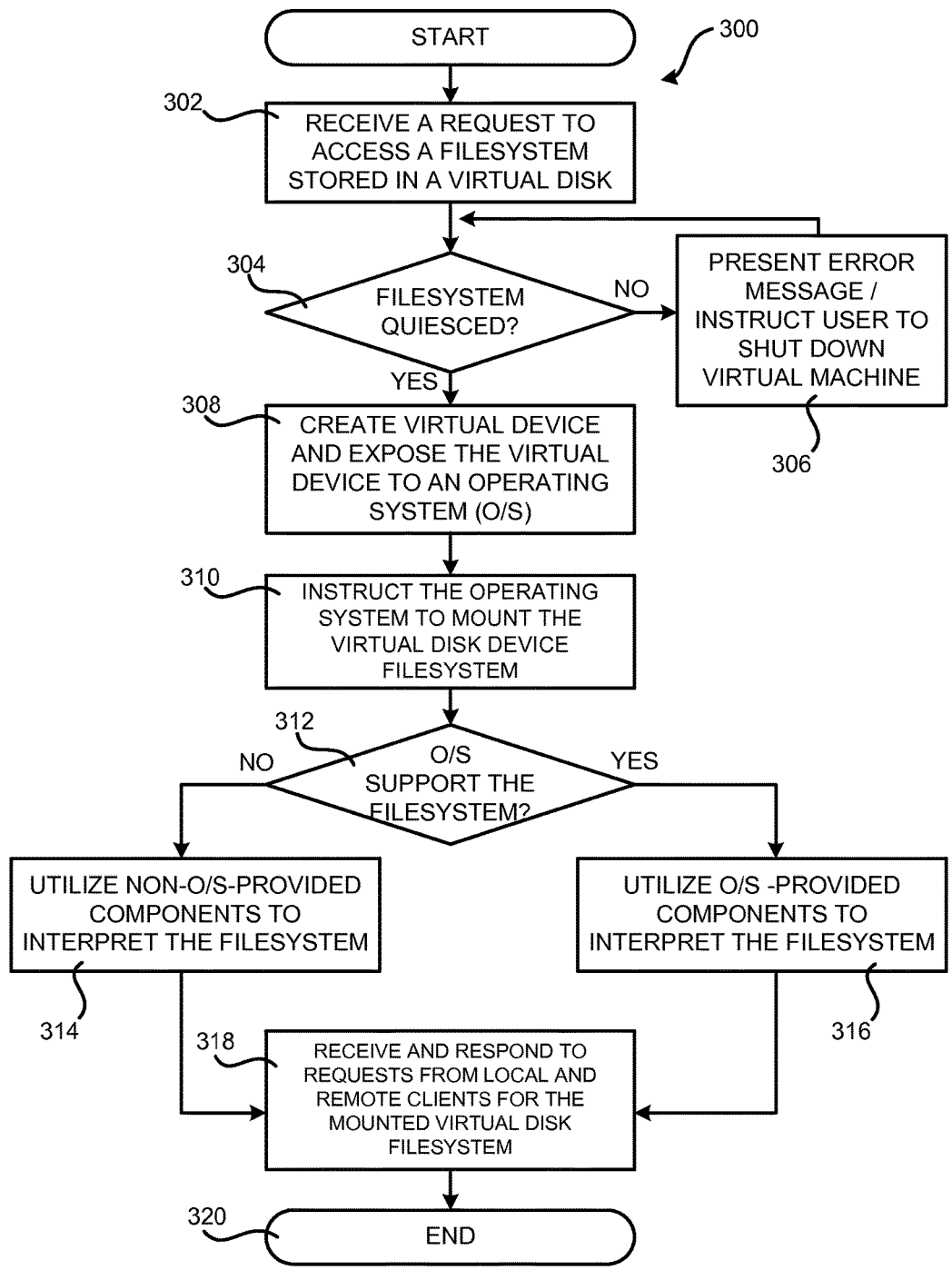
FIG. 3 is a flow diagram showing an illustrative routine that describes additional aspects of the mechanism shown in FIG. 1 for providing local and remote access to VMI filesystems utilizing a mounted virtual disk, according to one embodiment disclosed herein.

FIG. 3 is a flow diagram showing an illustrative routine 300 that describes additional aspects of the mechanism shown in FIG. 1 for providing local and remote access to VMI 106 filesystems utilizing a mounted virtual disk filesystem 116, according to one embodiment disclosed herein. It should be appreciated that the logical operations described herein with respect to FIG. 3 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the VM filesystem access component 110 executing on the host computer 102 receives a request to access a filesystem stored in a virtual disk 108 in a VMI 106. This request may come from a client application 118, for instance, from another component, or directly from a user through a user interface provided by the VM filesystem access component 110. In response to such a request, the routine 300 proceeds from operation 302 to operation 304.

At operation 304, the VM filesystem access component 110 determines whether the filesystem in the virtual disk 108 to be accessed is currently in a quiesced state or is in a non-quiesced state. For instance, the VM filesystem access component 110 might determine if the filesystem is currently mounted read-write in the guest operating system (i.e. non-quiesced). If the filesystem is not quiesced, the routine 300 proceeds from operation 304 to operation 306, where an error message may be presented. Additionally, a user may be provided an opportunity to place the filesystem into a quiesced state (e.g. unmounts the filesystem in the guest operating system or shut down the VMI 106). In other embodiments, the user might be provided an opportunity to access a recent snapshot. From operation 306, the routine 300 proceeds back to operation 302.

If, at operation 304, the VM filesystem access component 110 determines that the filesystem to be accessed is in a quiesced state, the routine 300 proceeds from operation 304 to operation 308. At operation 308, the VM filesystem access component 110 creates the virtual device 112 as described above with regard to FIG. 1. Once the virtual device 112 has been created, the routine 300 proceeds to operation 310, where the VM filesystem access component 110 instructs the operation system 114 to mount the virtual device 112.

From operation 310, the routine 300 proceeds to operation 312, where the VM filesystem access component 110 determines whether the operating system 114 includes components or functionality for interpreting the filesystem on the mounted virtual disk 108. If the operating system 114 does include support for the filesystem, the routine 300 proceeds from operation 312 to operation 316, where the operating system provided components are utilized to interpret and translate the filesystem contained in the mounted virtual disk 108. If, however, the operating system 114 does not include support for the filesystem, the routine 300 proceeds from operation 312 to operation 314, where non-operating system provided components are utilized to interpret and translate the filesystem contained in the mounted virtual disk 108. For instance, the VM filesystem access component 110 might perform the translation. Other components might also be utilized.

From operations 314 and 316, the routine 300 proceeds to operation 318. At operation 318, the operating system 114 receives and responds to requests for the mounted virtual disk filesystem 116. As mentioned above, clients can access the virtual disk 108 through the mounted virtual disk filesystem 116 and perform read and write operations thereby. Additionally, remote clients, such as the client application 118 executing on the remote computer 120, might also access the mounted virtual disk filesystem 116 through functionality provided by the operating system 114, such as a network filesystem or another type of operating system provided component like FTP or HTTP. From operation 318, the routine 300 proceeds to operation 320, where it ends.

Figure 4:
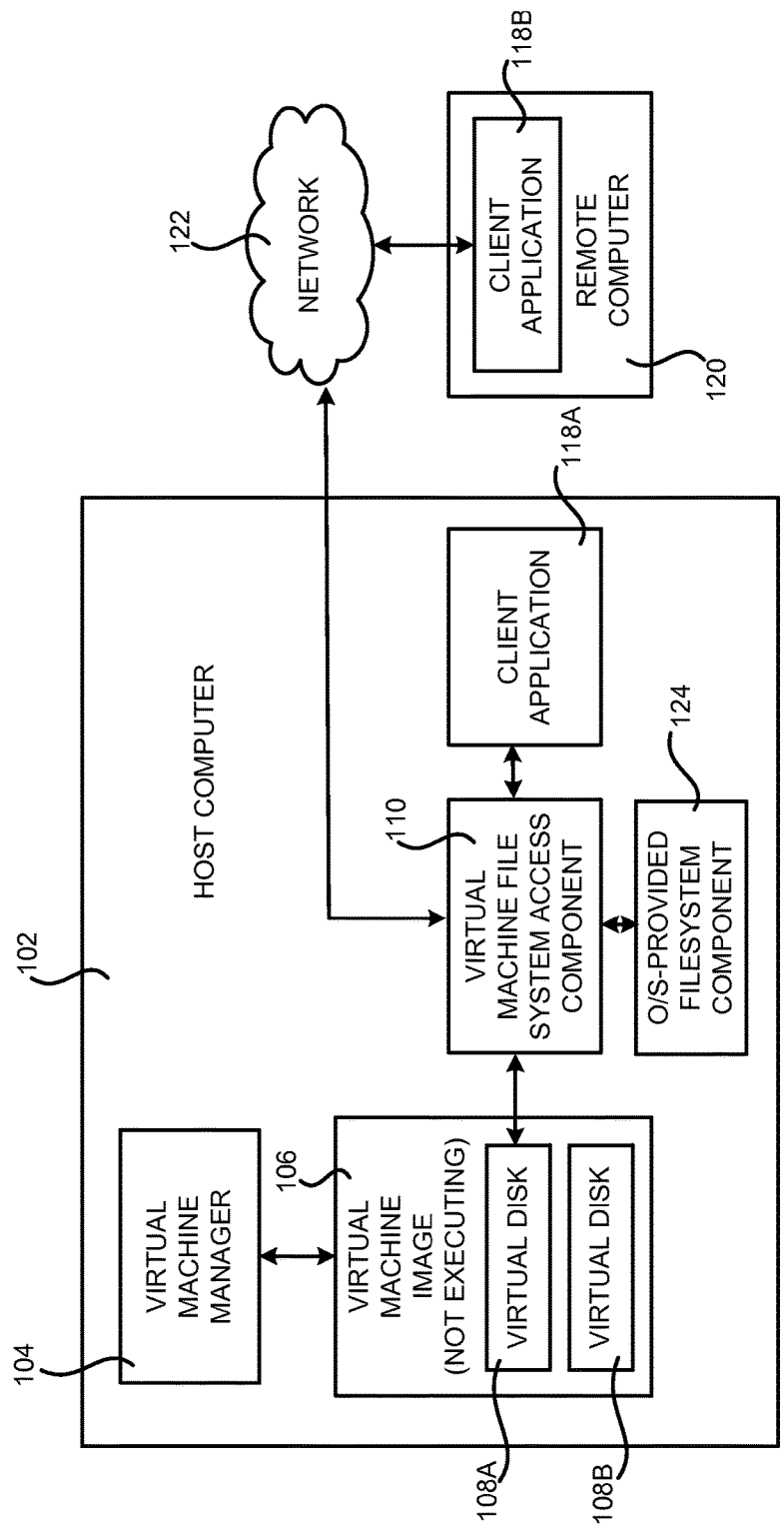
FIG. 4 is a network and system diagram showing aspects of one mechanism presented herein for providing local and remote access to VMI filesystems without utilizing a mounted virtual disk, according to one embodiment disclosed herein.

FIG. 4 is a network and system diagram showing aspects of one mechanism presented herein for providing local and remote access to VMI filesystems without utilizing a mounted virtual disk filesystem 116, according to one embodiment disclosed herein. As discussed above, it might be desirable to provide access to a VMI 106 filesystem in a virtual disk 108 when the virtual disk 108 is suspected to be infected with a virus or other type of malicious program code. By providing access to a filesystem without mounting the virtual disk 108 may reduce the risk that the host computer 102 and/or or a remote computer 120 accessing the virtual disk 108 will become infected by malicious components stored in the filesystem of the virtual disk 108.

In order to provide access to the filesystem in a virtual disk 108 without mounting the virtual disk 108, the VM filesystem access component 110 is configured in one embodiment to provide an interface through which other components or services can request to perform I/O operations on the filesystem in the virtual disk 108. For example, in one implementation, the VM filesystem access component 110 provides a Web-based (i.e. HTML over HTTP) user interface through which a client application 118A or 118B can perform operations on the filesystem in a virtual disk 108. The client applications 118A and 118B might be Web browser applications in such an embodiment. In other embodiments, the client applications 118 might be applications configured to interact with an application program interface ("API") or another type of interface exposed by the VM filesystem access component 110 for accessing the filesystem in a virtual disk 108. For instance, the VM filesystem access component 110 might directly expose an FTP interface for accessing the contents of the filesystem of a virtual disk 108. In some embodiments, the VM filesystem access component 110 might expose the filesystem of a virtual disk 108 through a filesystem that can be mounted by a remote client application 1108B.

As will be discussed in greater detail below, the VM filesystem access component 110 might utilize operating system provided components 124 for translating the filesystem in a virtual disk 108 when these components are available. If a host operating system 114 does not provide support for translating a particular filesystem, the VM filesystem access component 110 might utilize other non-operating system components to perform this functionality or perform the translation itself. In this way, the VM filesystem access component 110 can process requests to perform operations on a filesystem of a virtual disk 108 and perform these operations without mounting the virtual disk 108 in the manner presented above with regard to FIGS. 1 and 3. Additional details regarding this process will be provided below with regard to FIG. 5.

Figure 5:
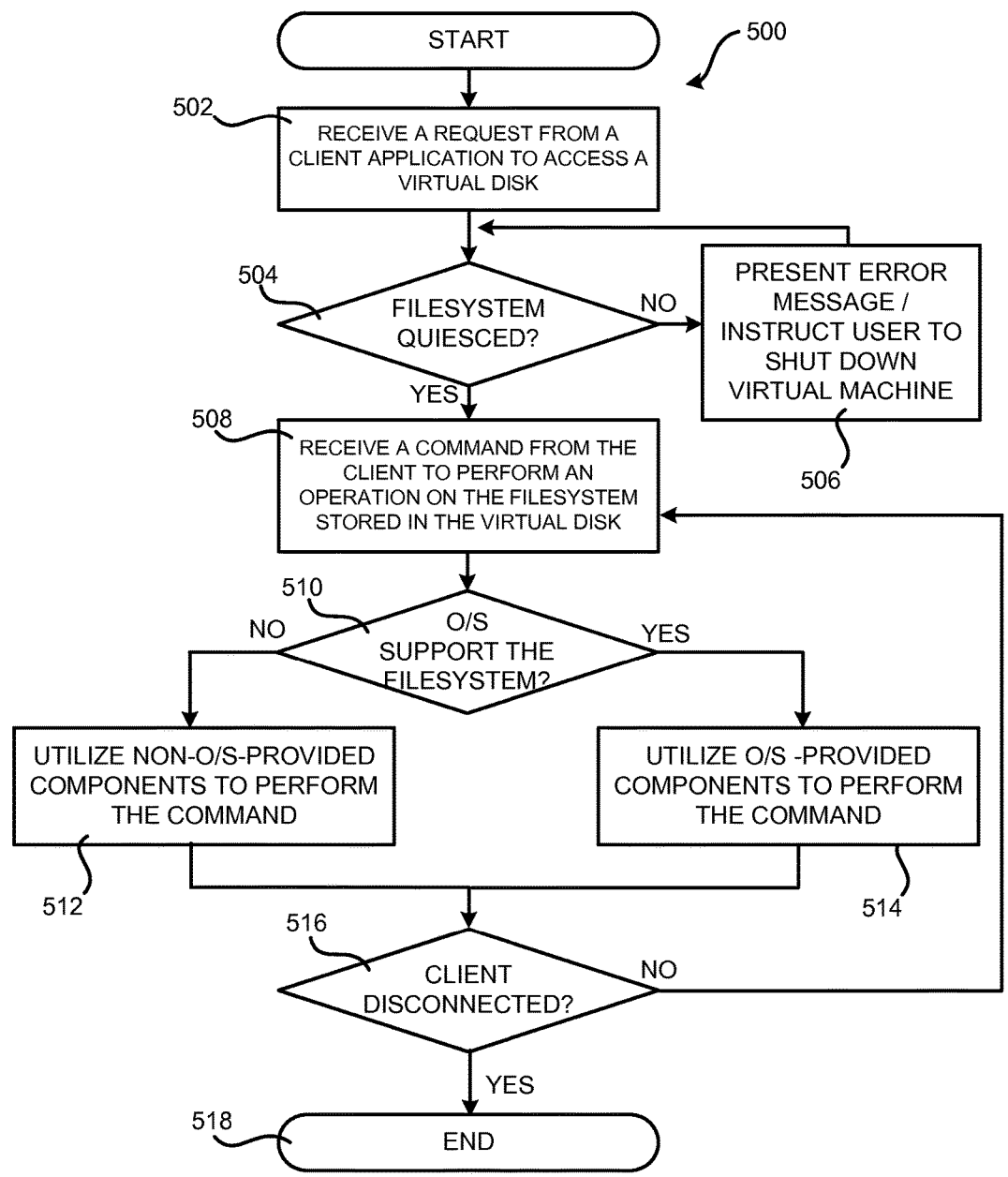
FIG. 5 is a flow diagram showing an illustrative routine that describes additional aspects of the mechanism shown in FIG. 4 for providing local and remote access to VMI filesystems without utilizing a mounted virtual disk, according to one embodiment disclosed herein.

FIG. 5 is a flow diagram showing an illustrative routine 500 that describes additional aspects of the mechanism shown in FIG. 4 for providing local and remote access to VMI 106 filesystems without utilizing a mounted virtual disk filesystem 116, according to one embodiment disclosed herein. The routine 500 begins at operation 502, where the VM filesystem access component 110 executing on the host computer 102 receives a request to access a filesystem stored in a virtual disk 108 in a VMI 106. This request may come from a client application 118, for instance, from another component, or directly from a user through a user interface provided by the VM filesystem access component 110. In response to such a request, the routine 500 proceeds from operation 502 to operation 504.

At operation 504, the VM filesystem access component 110 determines whether the filesystem in the virtual disk 108 to be accessed is currently in a quiesced state or is in a non-quiesced state. As in the previous embodiment, the VM filesystem access component 110 might determine if the filesystem is currently mounted by the guest operating system (i.e. non quiesced) or if the guest operating system has been shutdown (i.e. quiesced). If the filesystem is not quiesced, the routine 500 proceeds from operation 504 to operation 506, where an error message may be presented. Additionally, a user may be provided an opportunity to place the filesystem into a quiesced state (e.g. shut down the VMI 106). From operation 506, the routine 500 proceeds back to operation 502.

If, at operation 504, the VM filesystem access component 110 determines that the filesystem is in a quiesced state, the routine 500 proceeds from operation 504 to operation 508. At operation 508, the VM filesystem access component 110 receives a request from a client application, such as the client application 118A or the remotely executing client application 118B, to perform an operation on the filesystem of a virtual disk 108. As mentioned above, the VM filesystem access component 110 may provide a Web-based user interface or another type of interface for receiving such a command.

The operations requested by a client application 118 include, but are not limited to, operations for retrieving a directory listing, changing directory, retrieving a file, modifying a file, creating a new file, deleting a file, creating a directory, modifying a directory such as by renaming the directory, moving a file or directory, and changing metadata associated with a file or directory such as permissions, an access control list ("ACL"), or data indicating the date and/or time of last access. Other types of operations that can be performed on a filesystem might also be performed.

In response to receiving a command from a client application 118, the routine 500 proceeds to operation 510, where the VM filesystem access component 110 determines whether the operating system 114 includes components or functionality for translating the filesystem of the virtual disk 108 upon which the requested operation is to be performed. If the operating system 114 does include support for the filesystem, the routine 500 proceeds from operation 510 to operation 514, where the operating system provided components are utilized to perform the requested operation on the appropriate virtual disk 108. If, however, the operating system 114 does not include support for the filesystem, the routine 500 proceeds from operation 510 to operation 512, where non-operating system provided components are utilized to perform the requested I/O operation on the virtual disk 108. For instance, the VM filesystem access component 110 might perform the operation itself. Other components might also be utilized to perform the requested operation. The results of the performance of the operation might also be provided to the requesting client application 110.

From operations 512 and 514, the routine 500 proceeds to operation 516. At operation 516, the VM filesystem access component 110 determines whether the connected client application 118 has disconnected. If not, the routine 500 proceeds back to operation 508, where additional operations might be performed on the filesystem of a virtual disk 108 in a similar manner. If the client application 118 has disconnected from the VM filesystem access component 110, the routine 500 proceeds to operation 518, where it ends.

Figure 6:
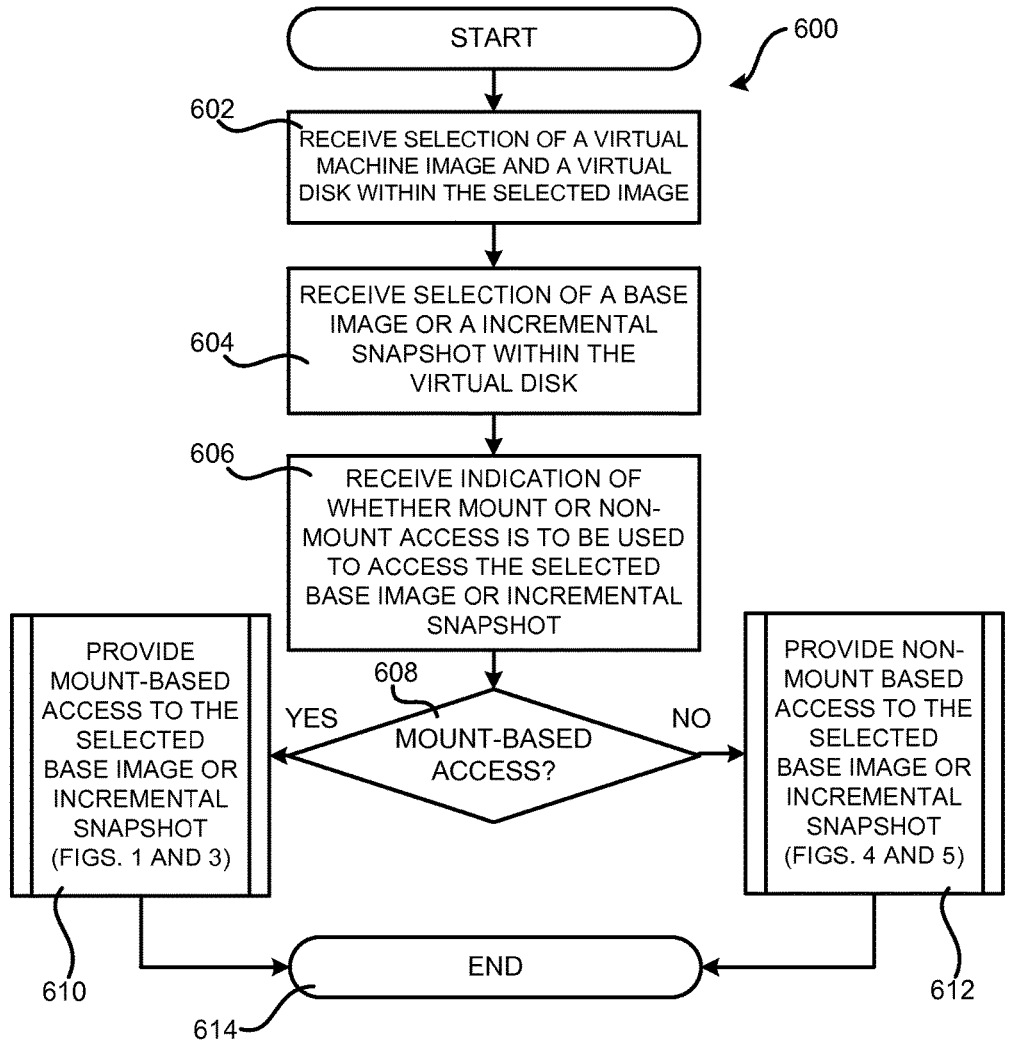
FIG. 6 is a flow diagram showing an illustrative routine that describes aspects of one mechanism disclosed herein for local and remote access to a VMI filesystem at a point in time defined by a snapshot, according to one embodiment disclosed herein.

FIG. 6 is a flow diagram showing an illustrative routine 600 that describes aspects of one mechanism disclosed herein for local and remote access to a VMI filesystem at a point in time defined by a snapshot 206, according to one embodiment disclosed herein. As mentioned above, the VM filesystem access component 110 is configured in one embodiment to provide access to a snapshot 206. The routine 600 shown in FIG. 6 illustrates this process in greater detail.

The routine 600 begins at operation 602, where the VM filesystem access component 110 receives a selection of a VMI 106 and a virtual disk 108 within the selected VMI 106 to be accessed. The routine 600 then proceeds from operation 602 to operation 604, where the VM filesystem access component 110 receives a selection of a base image 208 or an incremental snapshot 210 within the selected virtual machine 108. The VM filesystem access component 110 might provide an appropriate user interface through which a user can make these selections.

Once a base image 208 or an incremental snapshot 210 has been selected, the routine 600 proceeds from operation 604 to operation 606, where an indication is also received as to whether access should be performed by way of a mounted virtual disk filesystem 116 or in the manner described above with regard to FIGS. 4 and 5 without mounting a virtual disk 108. An appropriate user interface might be provided for making such a selection.

If access is to be had to the selected base image 208 or incremental snapshot 210 using a mounted virtual disk filesystem 116, the routine 600 proceeds from operation 608 to operation 610. At operation 610, the selected base image 208 or incremental snapshot 210 is mounted in the manner described above with regard to FIGS. 1 and 3. I/O operations may then be performed on the mounted virtual disk filesystem 116 in the manner described above with regard to FIGS. 1 and 3. In some embodiments, the VM filesystem access component 110 interacts with the VMM 104 to mount the selected base image 208 or incremental snapshot 210.

If access is to be had to the selected base image 208 or incremental snapshot 210 without using a mounted virtual disk filesystem 116, the routine 600 proceeds from operation 608 to operation 612. At operation 612, access is provided to the selected base image 208 or incremental snapshot 210 in the manner described above with regard to FIGS. 4 and 5. I/O operations may then be performed on the selected base image 208 or incremental snapshot 210 in the manner described above with regard to FIGS. 4 and 5. In some embodiments, the VM filesystem access component 110 interacts with the VMM 104 to access and perform I/O operations on the selected base image 208 or incremental snapshot 210. From operations 610 and 612, the routine 600 proceeds to operation 614, where it ends.

Figure 7:
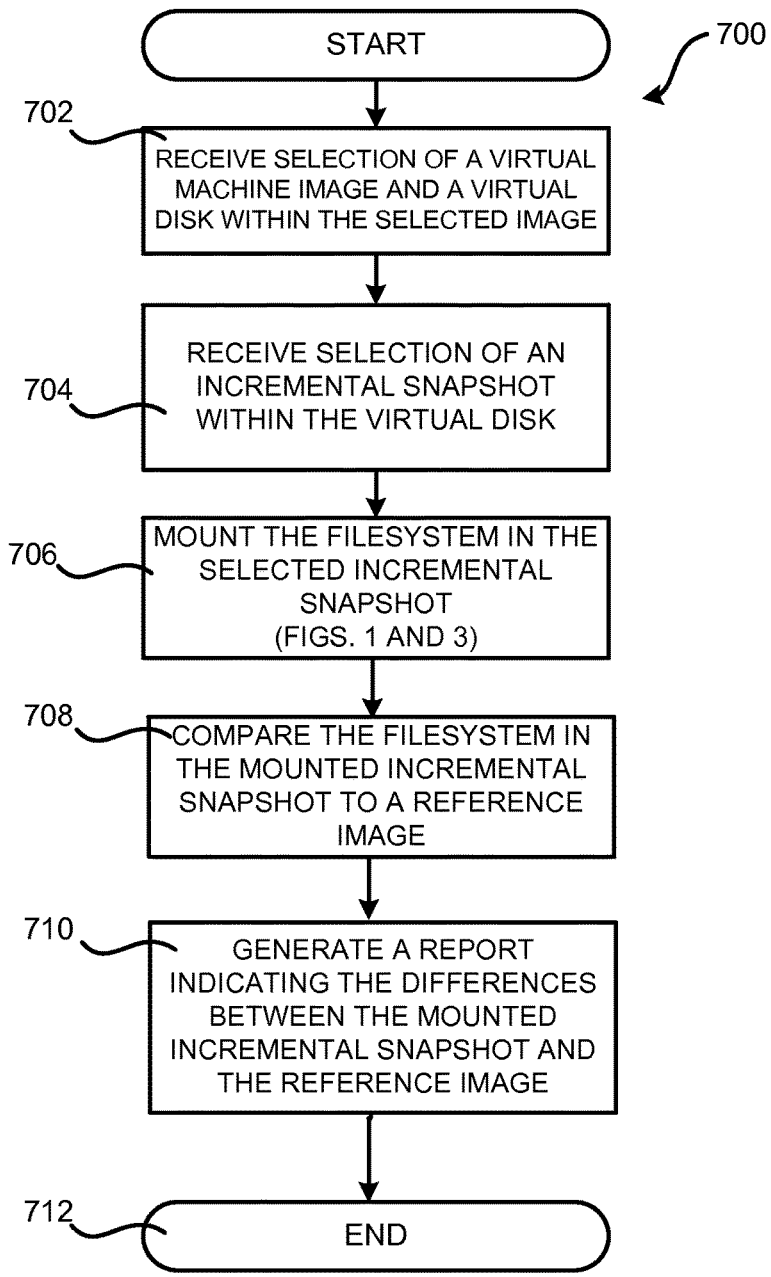
FIG. 7 is a flow diagram showing an illustrative routine that describes aspects of one mechanism disclosed herein for providing access to a VMI filesystem at a point in time defined by a snapshot in order to compare the contents of the filesystem contained therein to a filesystem in a reference image, according to one embodiment disclosed herein.

FIG. 7 is a flow diagram showing an illustrative routine 700 that describes aspects of one mechanism disclosed herein for providing access to a VMI filesystem at a point in time defined by a snapshot 206 in order to compare the contents of the filesystem contained therein to a filesystem in a reference image, according to one embodiment disclosed herein. As discussed briefly above, the functionality described above with regard to FIG. 6 for accessing the contents of a snapshot 206 at a particular point in time, even when the VMI 106 containing the snapshot 206 is not executing, enables various types of functionality. For example, an incremental snapshot 210 might be mounted in the manner presented above. The mounted snapshot 210 might then be compared to a reference disk image to identify any differences between the filesystem in the snapshot and the filesystem in the reference image. Identified differences might provide an indication of an unauthorized modification to the snapshot filesystem, such as those performed by viruses or other types of malicious program code. Additional details regarding this process are illustrated in FIG. 7.

The routine 700 begins at operation 702, where the VM filesystem access component 110 receives a selection of a VMI 106 and a virtual disk 108 within the selected VMI 106 to be accessed. The routine 700 then proceeds from operation 702 to operation 704, where the VM filesystem access component 110 receives a selection of an incremental snapshot 210 within the selected virtual machine 108. The VM filesystem access component 110 might provide an appropriate user interface through which a user can make these selections.

Once an incremental snapshot 210 has been selected, the routine 700 proceeds from operation 704 to operation 706, where the selected incremental snapshot 210 is mounted in the manner described above with regard to FIGS. 1 and 3. The routine 700 then proceeds to operation 708, where the filesystem on the mounted virtual disk filesystem 116 is compared to a filesystem in a reference image. The reference image might be a base image 208, for instance, that reflects an initial state of a virtual disk 108. Other types of reference images might be utilized.

From operation 708, the routine 700 proceeds to operation 710, where the VM filesystem access component 110 generates a report indicating the differences between the filesystem on the mounted virtual disk filesystem 116 and the filesystem in the reference image. As mentioned above, this data might be utilized to identify unauthorized modification to the snapshot filesystem, such as those performed by viruses or other types of malicious program code. Such a report might also be utilized for other purposes. From operation 710, the routine 700 proceeds to operation 712, where it ends.

It should be appreciated that, in various embodiments presented herein, the VM filesystem access component 110, or another component might also provide other types of functionality. For instance, the VM filesystem access component 110 might provide functionality for authenticating client applications 118 and/or perform other types of security processes. The VM filesystem access component 110 or another component might also provide functionality for decrypting virtual disks 108. The VM filesystem access component 110 or another component might also provide functionality for mediating access to a virtual disk 108 utilized by an executing VMI 106. The VM filesystem access component 110 and other components described herein might also provide other types of functionality not specifically described herein.

Figure 8:
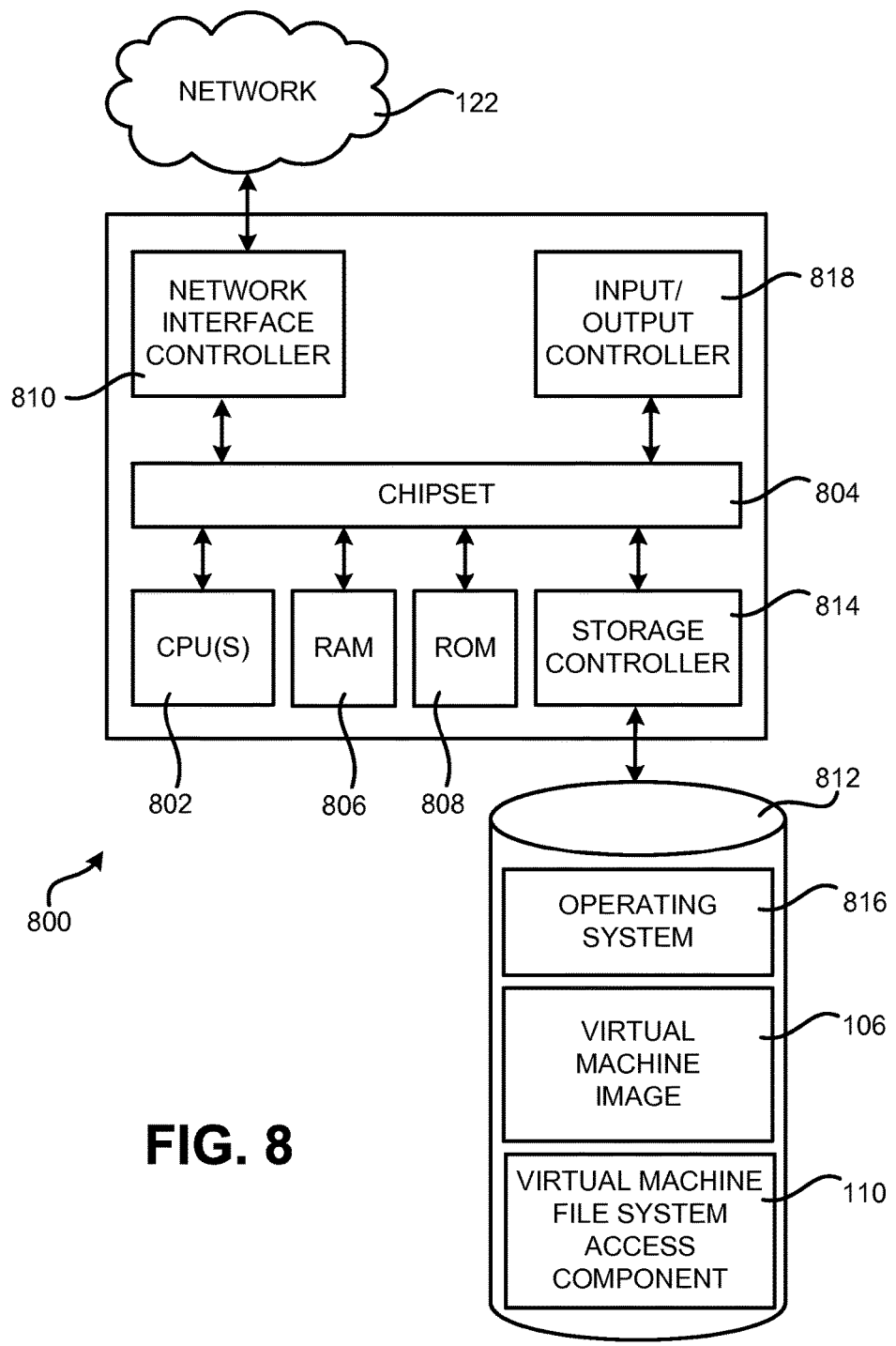
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing the program components described above for providing local and remote access to VMI filesystems. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components described above.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 may be standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the embodiments described herein.

The computer 800 may operate in a networked environment using logical connections to remote computing devices and computer systems through a network, such as the local area network 304. The chipset 804 may include functionality for providing network connectivity through a NIC 810, such as a gigabit Ethernet adapter. The NIC 810 is capable of connecting the computer 800 to other computing devices over the network 304. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, and the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 812 may store other system or application programs and data utilized by the computer 800, such as the VMI 106 and the VMI file system access component 110. The mass storage device 812 might also store other programs and data not specifically shown in FIG. 8. It should be appreciated the VMI might also be stored on a network-accessible mass storage device in some embodiments.

In one embodiment, the mass storage device 812 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions which, when executed by the computer 800, perform the routines 300, 500, 600, and 700, described above with regard to FIGS. 3, 5, 6, and 7, respectively.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing local and remote access to VMI filesystems have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing access to a filesystem stored in a virtual disk contained in a virtual machine image, the method comprising:
   receiving a request from a client application to perform an operation on the filesystem stored in the virtual disk;
   in response to receiving the request, determining whether the filesystem is currently in a quiesced state;
   in response to determining that the filesystem is not in the quiesced state:
      presenting, via a user interface, an error message and an opportunity to place the filesystem into the quiesced state; and
      placing the filesystem into the quiesced state by at least unmounting the filesystem or closing the virtual machine image;
   in response to determining that the filesystem is in the quiesced state, allowing a client application to access the filesystem stored in the virtual disk, the allowing comprising at least one of:
      causing an operating system of a host computer to mount the virtual disk, the mounting comprising:
         creating a virtual device;
         exposing the virtual device to the operating system;
         instructing the operating system to mount the virtual device;
         determining whether the operating system provides support for the filesystem; and
         in response to determining that the operating system provides support for the filesystem, utilizing one or more components provided by the operating system to interpret the filesystem; or
      providing an interface through which the client application is configured to request to perform the operation on the filesystem stored in the virtual disk, wherein the operation is performed without mounting the virtual disk.

2. The computer-implemented method of claim 1, wherein
   the one or more components include at least one of a network filesystem, a file transfer protocol component, or a hypertext transfer protocol component.

3. The computer-implemented method of claim 1, wherein
   in response to determining that the operating system does not provide support for the filesystem, utilizing one or more components not provided by the guest operating system to interpret the filesystem.

4. The computer-implemented method of claim 1, wherein allowing the client application to access the filesystem stored in the virtual disk further comprises providing access to a remote computer by way of a network file system.

5. The computer-implemented method of claim 1, wherein allowing the client application to access the filesystem stored in the virtual disk further comprises providing access to a remote computer by way of a component provided by the operating system.

6. The computer-implemented method of claim 1 wherein determining that the filesystem is in the quiesced state is based at least in part on at least one of a determination that a guest operating system has unmounted the filesystem, or a determination that that the guest operating system has been shut down.

7. A computer-implemented method for allowing a client application to access a filesystem stored in a virtual disk contained in a virtual machine image on a host computer, the method comprising:
   receiving a request from a client application executing on the host computer to perform an operation on the filesystem stored in the virtual disk on the host computer, the operation comprising at least one of modifying or creating a file;
   in response to receiving the request, determining whether the filesystem is currently in a quiesced state;
   in response to determining that the filesystem is not in the quiesced state:
      presenting, via a user interface, an error message and an opportunity to place the filesystem into the quiesced state; and
      placing the filesystem into the quiesced state by at least unmounting the filesystem or closing the virtual machine image;
   in response to determining that the filesystem is in the quiesced state, allowing the client application to access the filesystem stored in the virtual disk, the allowing the access comprising at least one of:
      causing an operating system of the host computer to mount the virtual disk, the mounting comprising:
         creating a virtual device;
         exposing the virtual device to the operating system;
         instructing the operating system to mount the virtual device
         determining whether the operating system provides support for the filesystem; and
         in response to determining that the operating system provides support for the filesystem, utilizing one or more components provided by the operating system to interpret the filesystem; or
      providing an interface through which the client application is configured to request to perform the operation on the filesystem stored in the virtual disk, wherein the operation is performed without mounting the virtual disk.

8. The computer-implemented method of claim 7, wherein the one or more components provided by the operating system include at least one of a network filesystem, a file transfer protocol component, or a hypertext transfer protocol component.

9. The computer-implemented method of claim 7, wherein the computer-implemented operations further comprise utilizing one or more components not provided by the operating system to interpret the filesystem.

10. The computer-implemented method of claim 7, wherein determining that the filesystem is in the quiesced state is based at least in part on a determination that a guest operating system has unmounted the filesystem.

11. The computer-implemented method of claim 10, wherein determining that the filesystem is in the quiesced state is based at least in part on a determination that the guest operating system has been shut down.

12. A non-transitory computer-readable storage medium having computer-executable instructions stored thereupon which, when executed by a computer, cause the computer to:
receive a request to access a filesystem stored in a virtual disk contained in a virtual machine image;
determine whether the filesystem is currently in a quiesced state in response to receiving the request;
in response to determining that the filesystem is not in the quiesced state:
present, via a user interface, an error message and an opportunity to place the filesystem into the quiesced state, and
place the filesystem into the quiesced state by at least unmounting the filesystem or shutting down the virtual machine image;
allow a client application to access the filesystem stored in the virtual disk in response to determining that the filesystem is in the quiesced state, the allowing access comprising at least one of:
causing an operating system of a host computer to mount the virtual disk, the mounting comprising:
creating a virtual device;
exposing the virtual device to the operating system;
instructing the operating system to mount the virtual device;
determining whether the operating system provides support for the filesystem; and
in response to determining that the operating system provides support for the filesystem, utilizing one or more components provided by the operating system to interpret the filesystem; or
providing an interface through which the client application is configured to request to perform an operation on the filesystem stored in the virtual disk without mounting the virtual disk, the operation comprising at least one of modifying or creating a file;
receive an additional request via the interface; and
in response to the additional request, perform the operation on the filesystem.

13. The non-transitory computer-readable storage medium of claim 12, wherein the virtual machine image is stored at the host computer, and wherein the client application is executing on the host computer.

14. The non-transitory computer-readable storage medium of claim 12, wherein the virtual machine image is stored at the host computer, and wherein the client application is executing on a remote computer.

15. The non-transitory computer-readable storage medium of claim 12, wherein the filesystem is stored in a base image of a snapshot stored in the virtual machine image.

16. The non-transitory computer-readable storage medium of claim 15, wherein the filesystem is stored in an incremental snapshot relative to the base image stored in the virtual machine image.

17. The non-transitory computer-readable storage medium of claim 16, having further computer-executable instructions stored thereupon which, when executed by the computer, cause the computer to compare the filesystem in the incremental snapshot to a filesystem in a reference image to identify one or more differences between the filesystem in the incremental snapshot and the filesystem in the reference image.

18. The non-transitory computer-readable storage medium of claim 12, wherein at least one of the request or the additional request is received by the operating system via a network, and wherein the operating system is in communication with the client application.

19. The non-transitory computer-readable storage medium of claim 12, wherein determining that the filesystem is in the quiesced state is based at least in part on a determination that a guest operating system has unmounted the filesystem.

* * * * *